United States Patent [19]

Marianu

[11] 4,444,296
[45] Apr. 24, 1984

[54] SPOT-TYPE DISC BRAKE WITH ADDITIONAL AXIAL FORCE APPLICATION TO A REGION OF THE BRAKE SHOE

[75] Inventor: Vlad Marianu, Ffm.-Griesheim, Fed. Rep. of Germany

[73] Assignee: ITT Industries, Inc., New York, N.Y.

[21] Appl. No.: 343,658

[22] Filed: Jan. 28, 1982

[30] Foreign Application Priority Data

Apr. 7, 1981 [DE] Fed. Rep. of Germany ....... 3114047

[51] Int. Cl.³ ............................................. F16D 65/04
[52] U.S. Cl. ................................ 188/72.2; 188/196 R
[58] Field of Search ............ 188/72.2, 72.1, 72.3–72.9, 188/70 B, 135, 136, 342, 370, 71.8, 73.36, 73.37, 73.39, 73.41, 73.42, 73.43, 73.47, 205, 216, 196, 140 A

[56] References Cited

U.S. PATENT DOCUMENTS

| | | | |
|---|---|---|---|
| 3,422,933 | 1/1969 | Van House et al. | 188/72.2 |
| 3,662,864 | 5/1972 | Evans | 188/72.2 |
| 3,837,438 | 9/1974 | Hollnagel | 188/72.2 |

FOREIGN PATENT DOCUMENTS

| | | | |
|---|---|---|---|
| 829866 | 3/1960 | United Kingdom . | |
| 2096257 | 10/1982 | United Kingdom | 188/72.2 |

*Primary Examiner*—Douglas C. Butler

*Attorney, Agent, or Firm*—James B. Raden; Marvin M. Chaban

[57] ABSTRACT

A spot-type disc brake unit which cooperates with a brake disc when in use to form a disc brake includes a brake shoe carrier member and at least one brake shoe carried by the carrier member for axial movement toward and away from the brake disc, and with freedom of limited circumferential displacement upon entrainment of the brake shoe by the brake disc during the braking operation. The brake shoe includes a lining having a friction surface facing toward the brake disc and a backing plate rigid with the lining and having a backing surface facing away from the brake disc, as well as disc entry and disc exit, substantially circumferentially facing, end surfaces. A braking-force bell crank lever is arranged at least at the disc exit end surface of the backing plate. The lever has a first lever arm which extends into the path of circumferential displacement of the brake shoe, and a second lever arm which extends into juxtaposition with a selected region of the backing surface to apply an additional augmenting axial force to the brake shoe at such region. The lever has a fulcrum portion which engages an engagement surface of the carrier member to constitute a pivot axis for the lever therewith during the braking operation. Upon termination of the braking operation, the lever is attracted by a spring to the backing plate to compensate for the diminishment of the thickness of the lining attributable to the wear of the latter.

19 Claims, 8 Drawing Figures

FIG. 3
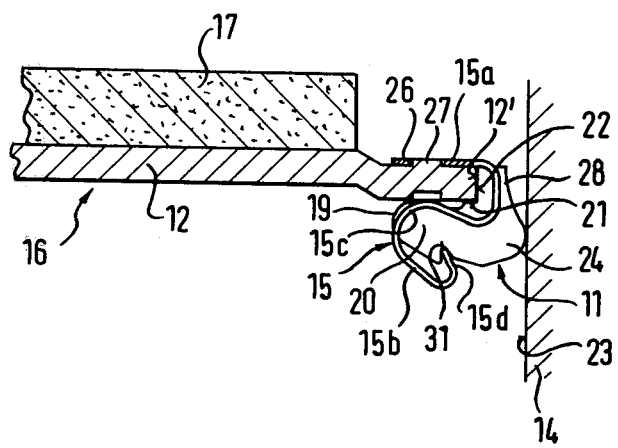
FIG. 4
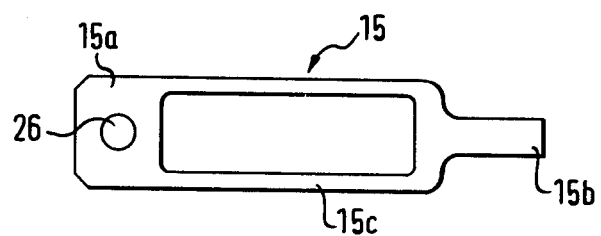
FIG. 5

SPOT-TYPE DISC BRAKE WITH ADDITIONAL AXIAL FORCE APPLICATION TO A REGION OF THE BRAKE SHOE

BACKGROUND OF THE INVENTION

The present invention relates to spot-type disc brakes in general, and more particularly to a disc brake with additional axial force application to a region of the brake shoe.

There is already known a spot-type disc brake construction which includes at least one force-actuated brake shoe which is supported in a circumferential direction, at least at the disc exit edge as considered in the forward direction, on a brake shoe carrier member via a braking-force bell crank lever pivotable about a substantially radial tilting axis. In this construction, a first lever arm of the lever abuts on the disc exit edge of the backing plate of the brake shoe in such a manner that it receives frictional forces acting in the circumferential direction on the brake shoe. However, the first lever arm permits axial sliding movement between the backing plate and the first lever arm. The tilting axis of the bell crank lever is supported in the circumferential direction on the brake shoe carrier member. The second lever arm of the lever extends to the back of the backing plate of the brake shoe and exerts on the latter an additional axial force which depends upon the braking force and the ratio of the lengths of the lever arm. Usually, the brake shoe carrier member is constituted by a brake carrier element. However, in a floating-caliper brake, the floating caliper is also able to support one brake shoe or both of them in the circumferential direction.

It is known that the piston-close brake lining in disc brakes and ring disc brakes is subjected to greater wear on the disc entry edge than on the disc exit edge. This is attributable both to the friction forces at the lining supporting area and to the displaced positioning of the supporting area relative to the friction surface, which results in an inclinedly acting torque. This effect is particularly disadvantageous in caliper brakes with relatively wide brake shoes.

To counteract the one-sided increased wear of the brake lining, it has already been proposed to displace the piston in the circumferential direction off-center towards the disc exit edge. However, this solution has the disadvantage that the brake and, consequently, its deformation become asymmetrical.

A spot-type disc brake has already been proposed in the British Patent Specificiation No. 829,866, which is capable of augmenting the braking force. In this construction, braking-force bell crank levers are provided on both the disc entry and the disc exist edges, these levers being mounted on the brake support member for pivoting about substantially radially extending shafts. The first lever arm of each of these braking-force bell crank levers abuts on the disc entry or on the disc exit edge at the backing plate of the brake shoe in such a manner that it receives frictional forces acting in the circumferential direction on the brake shoe and transmits them to the second lever arm which rests against the back of the backing plate. When braking, the brake shoe is entrained in the circumferential direction by the brake disc and acts on one of the two first lever arms of the braking-force bell crank levers. This results in the application of an additional braking force to the brake shoe in the axial direction, with attendant augmentation of the primary braking force which was initially applied from the outside.

However, the disadvantage of this known spot-type disc brake is that, with increasing wear of the brake linings, the braking-force bell crank levers have to be pivoted by a gradually increasing amount to retain the second lever arms in abutment with the carrier plate. As a result of this, the first lever arm gradually moves further away from its abutment surface on the backing plate of the brake shoe.

SUMMARY OF THE INVENTION

Accordingly, it is a general object of the present invention to avoid the disadvantages of the prior art.

More particularly, it is an object of the invention to provide a disc brake unit with additional axial force application to a region of the brake shoe, which avoids the disadvantages of the conventional disc brake units of this type.

Still another object of the present invention is to so construct the disc brake unit of the type here under consideration that the position of the bell-crank lever relative to the brake shoe remains virtually unchanged as the thickness of the friction lining diminishes due to increasing wear thereof.

It is still another object of the present invention to so design the disc brake unit of the above type that the magnitude, point of application, and time of application is substantially independent of the wear.

A concomitant object of the present invention is to develop a spot-type disc brake of the above type which is simple in construction, inexpensive to manufacture, easy to use, and reliable in operation nevertheless.

In pursuance of these objects and others which will become apparent hereafter, one feature of the present invention resides in a spot-type disc brake unit for use with a brake disc rotatable about an axis relative to a support at least in a forward circumferential direction, this unit comprising a brake shoe carrier member nonrotatably mounted on the support in use; at least one brake shoe mounted on the carrire member for movement axially of the brake disc and with freedom of limited displacement at least in the forward circumferential direction of the brake disc in use, the brake shoe having a friction surface facing toward and a backing surface facing away from the brake disc, and disc entry and exit end faces respectively facing substantially opposite to and in the forward circumferential direction of the brake disc in use; means for moving the brake shoe during a braking operation into a position in which the friction surface engages the brake disc to brake the same and the brake disc entrains the brake shoe for limited displacement therewith in the forward circumferential direction; and means for applying an additional force to a selected region of the brake shoe during the braking operation, including at least one bell-crank lever element disposed at the disc exit end face and having a first arm extending into the path of displacement of the disc exit end face in the forward circumferential direction to receive an actuating force therefrom, a fulcrum portion axially movable relative to the carrier member and so engaging the same at least during the braking operation as to prevent relative axial movement therebetween, and a second arm extending into juxtaposition with the backing surface at the selected region of the brake shoe and operative for applying the additional force thereto upon angular displacement of the lever element by the actuating force about the fulcrum portion, and means for resiliently attracting the lever element to the brake shoe such that, between the braking operations, the lever element and the area of engagement of the fulcrum portion thereof with the carrier member follow the brake shoe in its axial movement toward the brake disc as wear at the friction surface gradually reduces the axial thickness of the brake shoe. Advantageously, the brake shoe includes a backing plate having the backing surface, and a friction lining rigid with the backing plate and having the friction surface. The resilient attracting means advantageously includes spring means acting on the brake shoe and on the lever element. It is further advantageous when the lever element is so arranged relative to the carrier member that the fulcrum portion supports the same on the carrier member for angular displacement during the braking operation about a pivoting axis substantially parallel to the radial direction of the brake disc.

A particular advantage of this construction is that the braking-force bell crank lever element, when constructed in accordance with the present invention, practically forms a part of the brake shoe which, like the brake shoe itself, approaches the brake disc more and more with increasing wear of the brake lining. Accordingly, the pivoting axis of the braking-force bell crank lever continuously moves in the direction of the brake disc with increasing brake lining wear. The mode of operation of the braking-force augmenting arrangement constituted by the bell crank lever element is thus practically independent of the wear of the brake lining.

The arrangement for augmenting the braking force or for applying the additional axial force to the brake shoe according to the present invention offers a particular advantage when it is utilized for compensating for the above-mentioned uneven wear of brake linings when the braking-force bell crank lever is so designed that an additional force takes effect on the backing plate precisely at that point at which too slight an amount of wear can be ascertained. By suitably dimensioning and locating the braking-force bell crank lever, the inclinedly acting torque referred to above can be eliminated or counteracted.

However, preferably the braking-force bell crank lever is so designed that an increased contact force results, i.e. that augmentation of the braking force is achieved. To obtain uniformly distributed lining wear even in this instance, the piston will have to be displaced in the direction of the disc entry edge.

In a currently preferred construction according to the invention, the braking-force bell crank lever is held by the spring force in abutment in the axial direction on the backing plate, not only at the free end of the second lever arm, but also at an axial abutment surface disposed close to the first lever arm. It is particularly advantageous in this arrangement when the axial abutment surface extends substantially at a right angle from a circumferential stop surface of the first lever arm.

The need for the provision of a complicated pivot bearing can be avoided by arranging for the pivoting axis to be defined by an arched projection of the braking-force bell crank lever, which projection abuts a substantially radially extending engagement surface of the brake shoe carrier member. In this arrangement, the projection is advantageously constituted by a bead which extends substantially parallel to the radial direction. By virtue of this design, the braking-force bell crank lever conducts a rolling motion on the engagement surface during the braking operation.

To reliably prevent axial sliding of the braking-force bell crank lever relative to the brake shoe carrier member when braking, in accordance with a further aspect of the invention, there is provided means at the area of engagement of the fulcrum projection with the abutment surface for increasing friction in the axial direction in response to application of pressure in the circumferential direction. Such friction-increasing means may be constituted, for instance, by a notch extending substantially parallel to the radial direction at the area of contact of the fulcrum projection with the engagement surface of the carrier member.

The spring force required for retaining the braking-force bell crank lever at the brake shoe is preferably exerted by a spring which extends between the braking-force bell crank lever and the backing plate. Advantageously, this spring is a tension spring.

It is, however, even more advantageous when the spring is constructed as an undulating spring which thus simultaneously exerts the spring force and maintains the braking-force bell crank lever in the desired position on the backing plate of the brake shoe while urging the lever toward the backing plate in a direction that is axial and tangential with respect to the brake disc.

In a particularly advantageous embodiment, the undulating spring is a leaf spring which is curved approximately like an S or a Z in tangential cross section, with one leg abutting the backing plate from the front, while the opposite leg abuts the braking-force bell crank lever from the rear. Such springs provide most economical manufacture, ease of assembly and also great functional reliability.

To be able to safely retain, simultaneously with the leaf spring, also the braking-force bell crank lever, it is proposed, in accordance with a further facet of the invention, that the leg resting against the front face of the backing plate contain a bore receiving, in a fitting manner, a peg which projects from the front face of the backing plate.

Furthermore, it is advantageous for the central portion of the leaf spring to expand to form a frame fitting partially accommodating the braking-force bell crank lever.

According to another aspect, the spiral spring is a bracket-like wire spring which bears, on the one hand, against the front face of the backing plate and, on the other hand, against the braking-force bell crank lever or against stops provided thereon.

It is possible in floating-caliper brakes that the support of the brake shoes takes place on the brake caliper so that the brake caliper forms the brake shoe carrier member and is, in turn, guided and supported on the brake support member. It will be sufficient in this case when only the brake shoe close to the piston is equipped with the braking-force bell crank lever, since the reaction force is transmitted via the brake caliper onto the oppositely disposed brake shoe close to the caliper as well. One braking-force bell crank lever may be saved as a result.

BRIEF DESCRIPTION OF THE DRAWING

Above-mentioned and other features and objects of this invention will become more apparent by reference to the following description taken in conjunction with the accompanying drawing, in which:

FIG. 3 is a fragmentary sectional view analogous to FIG. 1 but showing a different construction of the bell crank lever, FIG. 4 is a partly sectioned side elevational detail view of the leaf spring used in the construction according to FIG. 3, FIG. 5 is a top plan view of the leaf spring shown in FIG. 4 in its initial flat state, prior to bending to adopt the shape shown in FIG. 4.

DETAILED DESCRIPTION OF THE PREFERRED EMBODIMENTS

Figure 1:
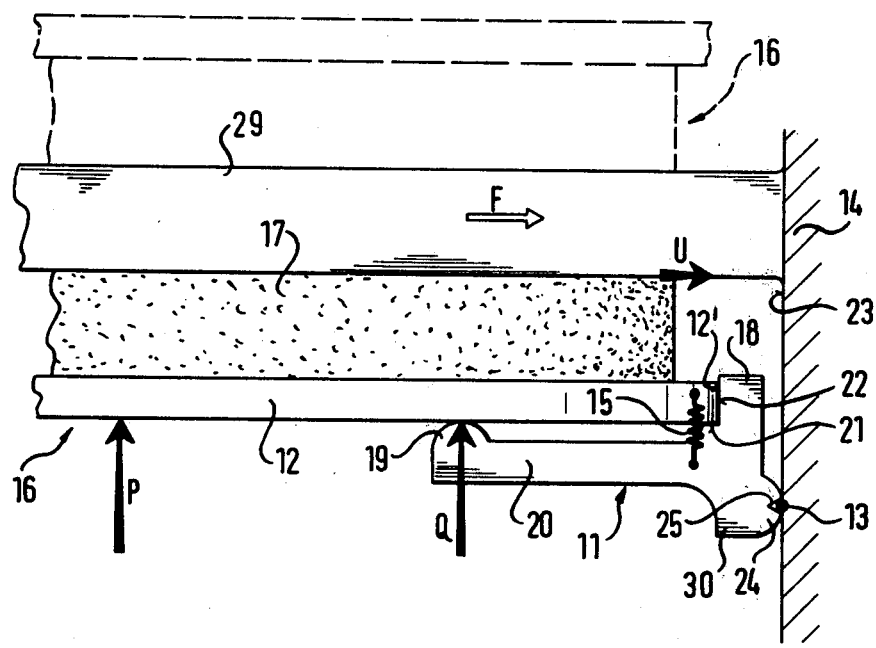
FIG. 1 is a schematic fragmentary tangential partially sectioned view showing the basic components of a spot-type disc brake according to the present invention.

Referring now to the drawing in detail, and first to FIG. 1 thereof, it may be seen that the reference numeral 28 identifies a brake disc of a spot-type disc brake, the brake disc 29 rotating in the direction of an arrow F when driving forwardly. The brake disc 29 cooperates with a disc brake unit constructed in accordance with the present invention to form the disc brake when assembled therewith. Thus, for convenience, reference will be had when describing the disc brake unit to various directions of the brake disc 29.

The disc brake unit includes brake shoes 16 which can be pressed against the brake disc 29 from opposite sides. This may be accomplished pursuant to the known principles of fixed-type or floating calipers.

Since the mode of operation of the brake force augmentation or additional force application is similar at both brake shoes 16 according to the present invention, the upper brake shoe 16 is indicated in FIG. 1 only by dotted lines, while the lower brake shoe 16 is shown in full lines and will be described in more detail in the following as regards the type and the design of the arrangement for augmenting the brake force. The arrangement and mode of operation of the brake force augmenting arrangement on the side of the brake shoe 16 that is only shown in dotted lines correspond thereto.

When, according to FIG. 1, a lining 17 of the brake shoe 16 is urged against the brake disc 29 due to application of a brake force P to a backing plate 12, the brake disc 29 tends to entrain the brake shoe 16 for movement in the direction of an arrow U, owing to the friction effective between the lining 17 and the brake disc 29.

To counteract this entraining motion, the backing plate 12 is supported on a braking-force bell crank lever 11 in the direction of the arrow U, according to the present invention. The bell crank lever 11 has a first arm 18 extending substantially axially to a circumferential end surface 12' of the carrier plate 12. There, the first lever arm 18 comprises a circumferential stop surface 22 on which the end surface 12' of the backing plate 12 abuts.

Extending at a right angle from the circumferential stop surface 22 at the end remote from the brake disc 29 is an axial abutment surface 21 which, as shown in FIG. 1, is urged against the rear surface of the backing plate 12 by means of a tension spring 15 extending between the braking-force bell crank lever or lever element 11 and the backing plate 12. A second lever arm 20 of the braking-force bell crank lever 11 which extends behind the backing plate 12 has an end bead 19. The spring 15 also urges the end bead 19 toward abutment with the backing plate 12.

Furthermore, the braking-force bell crank lever 11 includes an extension or fulcrum portion 30 which extends axially away from the disc 29 and is provided with a bead 24 on its side remote from the second lever arm 20. The bead 24 has the shape of a semi-cylinder and its axis extends substantially parallel to the radial direction. The apex of the bead 24 includes a notch 25 and bears in the circumferential direction U against an engagement surface 23 of a brake carrier member 14. The engagement surface 23 extends substantially normal to the circumferential direction U or substantially along a plane parallel to the radial direction, so that the abutment surface 23 is able to receive the brake forces acting in the circumferential direction.

A substantially radially extending pivoting axis 13 for the braking-force bell crank lever 11 is defined at the region of engagement of the bead 24 with the engagement surface 23.

Figure 2:
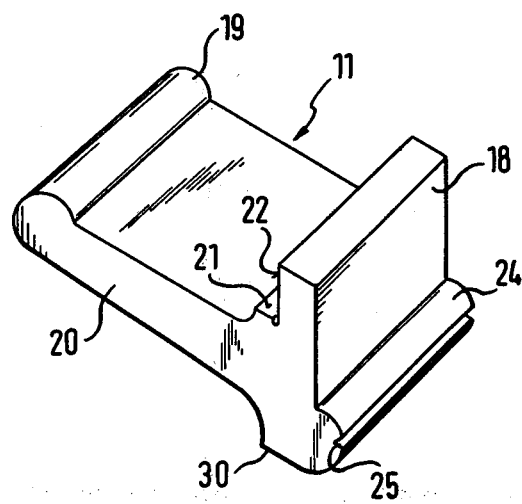
FIG. 2 is a perspective view of the braking-force bell crank lever for a spot-type disc brake according to the present invention as illustrated in FIG. 1.

FIG. 2 is a perspective view of the braking-force bell crank lever 11 which is shown in a side elevational view in FIG. 1.

The mode of operation of the spot-type disc brake according to the invention as described so far is as follows:

When the brake force P is applied to the carrier plate 12, the brake lining 17 is urged axially against the brake disc 29. If the brake disc turns in the direction of the arrow F, it tries to entrain the brake shoe 16 for movement in the direction of the arrow U by frictional engagement. As a result of this, a circumferential force is exerted on the circumferential stop surface 22 of the first lever arm 18 of the braking-force bell crank lever 11 by the end surface 12' of the backing plate 12. Since the braking-force bell crank lever 11 is supported on the engagement surface 23 of the brake carrier member 14 by means of the bead 24 of the fulcrum portion 30 at a point axially spaced from the circumferential stop surface 22, a torque will be exerted on the braking-force bell crank lever 11 which tries to pivot the lever or lever element 11 about the substantially radially parallel extending pivot axis 13. Via the second lever arm 20, this torque is converted into a substantially axial additional brake force Q which acts substantially in the axial direction on the rear side of the backing plate 12.

It is important for the operation of the spot-type disc brake in accordance with the present invention, that, as a result of the urging the braking-force bell crank lever 11 against the abutment surface 23, there be generated such an amount of axial friction between the braking-force bell crank lever 11 and the brake support member 14 that these two components are not allowed to displace relative to one another during the braking operation. A groove or notch 25 serves to increase this friction, its edges being able to firmly engage or dig into the abutment surface 23 so that axial relative displacement between the braking-force bell crank lever 11 and the brake support member 14 is prevented when braking. Thus, the braking-force bell crank lever 11 is angularly displaced during braking in such a manner as if it were affixed to the brake support member 14 for pivoting about the pivot axis 13.

As soon as the braking operation is terminated, the brake shoe 16 will return to its initial position again for establishment of the brake clearance, while the braking-force bell crank lever 11 pivots back to its initial position as well.

Wear of the brake lining 17 causes the backing plate 12 not to completely return to its initial inactive position after a braking operation. Rather, the backing plate 12 comes to a stop at a shorter distance from the brake disc 29.

Inasmuch as the backing plate 12 had lifted during the preceding braking operation from the axial abutment surface 21 of the braking-force bell crank lever 11, it will consequently not readily move into abutment with the axial abutment surface 21 again after the termination of the braking operation due to the wear of the brake lining 17. However, since the friction force between the bead 24 and the engagement surface 23 considerably decreases or completely disappears after the braking, the spring 15 can now displace the braking-force bell crank lever 11 so that the abutment surface 21 will eventually again move into abutment with the backing plate 12. In other words, the braking-force bell crank lever 11 follows the movement of the backing plate 12 in the direction toward the brake disc 29 even as the lining 17 is worn out. Only during the braking operation itself will the braking-force bell crank lever 11 be hindered in performing this following movement.

In the following description of the constructions depicted in FIGS. 3 to 8, the parts corresponding to those of the construction according to FIGS. 1 and 2 have been identified by corresponding reference numerals.

In the construction of FIG. 3, the braking-force bell crank lever 11 is designed as a compact disc-shaped component, while the spring 15 which serves for restoring the position of the lever element 11 is designed as a Z-shaped bent or undulating leaf spring. In its flat state shown in FIG. 5, the leaf spring 15 includes at its one end a bore 26 having adjacent thereto a frame-like enlarged portion 15c. On its opposite end, the leaf spring 15 has a retaining lug 15b.

After the spring 15 has been punched out in the shape illustrated in FIG. 5, it is bent to form a Z as can be gathered from FIG. 4.

Having the shape according to FIG. 3, the braking-force bell crank lever 11 can now be inserted into the frame-like opening of the spring 15, with a bent-off end 15d of the lug 15b engaging in an indentation 31 of the braking-force bell crank lever 11.

Afterwards, the combined structure comprising the the braking-force bell crank lever 11 and the leaf spring 15 is slid onto the backing plate 12 by upwardly bending the leg 15a in the way to be seen from FIG. 3. The backing plate is provided at its front face next to the lining 17 with a stamped-out peg or pin 27. The bore 26 of the spring 15 is then snapped on the peg 27. The upper curve of the leaf spring 15 as considered in FIG. 3 is so dimensioned as to urge the braking-force bell crank lever 11 axially against the rear side of the backing plate 12. By virtue of the peg-bore engagement 26–27 and the arrangement of the braking-force bell crank lever 11 in the opening of the intermediate or frame portion 15c, the braking-force bell crank lever 11, together with the spring 15, is safely held even in the radial direction. However, the braking-force bell crank lever 11 is able to resiliently move axially away from the backing plate 12 in a manner necessary for perfect function. It is held on the backing plate 12 by the spring 15 even in the circumferential direction.

Figure 7:
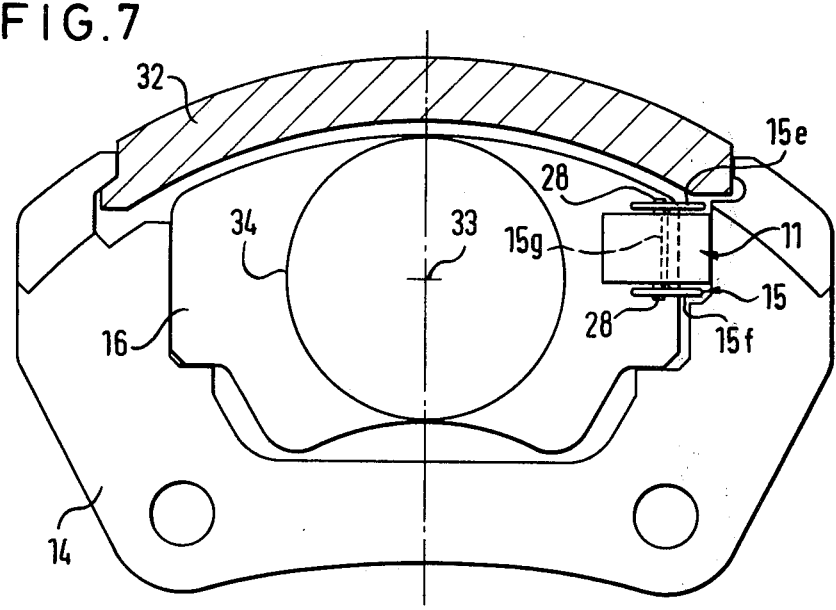
FIG. 7 is a partly sectional view of the construction of FIG. 6.
Figure 6:
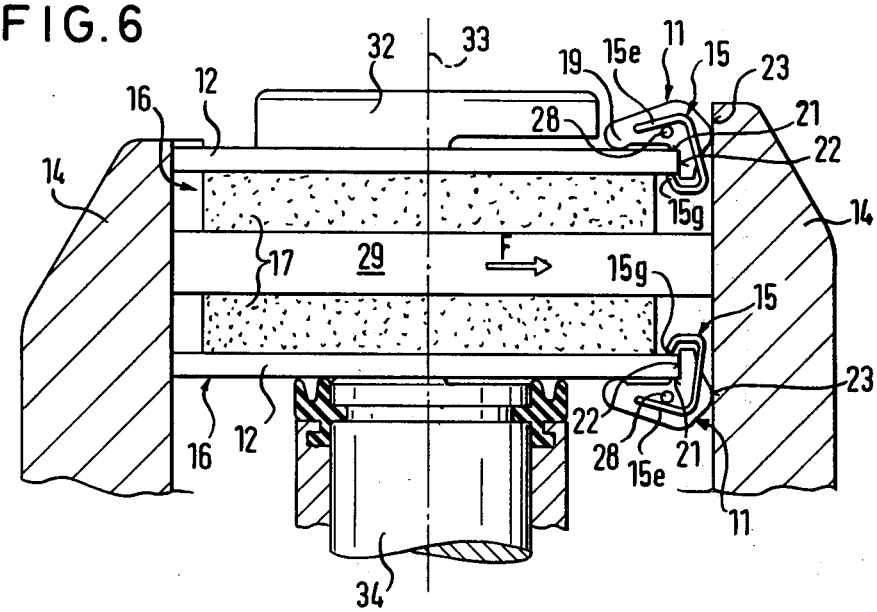
FIG. 6 is a tangential sectional view showing still another construction of the spot-type disc brake according to the present invention, in which both brake shoes are shown unlike in FIGS. 1 and 3.

FIGS. 6 and 7 illustrate a floating-caliper brake incorporating a brake piston 34 and a floating caliper 32 which are secured to the brake support member 14 in a conventional manner.

The braking-force bell crank lever 11, which serves to augment the brake force P, is located at each of the brake shoes 16, but only on the disc exit edge as considered in the forward driving direction F. As shown in FIG. 6, the piston 34 and the floating caliper 32 act on the backing plates 12 in a manner which is asymmetric relative to the axis 33, that is, in such a manner that the point of application of the resultant of the brake forces is displaced towards the disc entry edge. It will be thus taken into account that the brake augmentation by the braking-force bell crank lever 11 is achieved on the disc exit edge. In particular, the displacement of the point of application of the brake forces should be such that, on the whole, there will be accomplished a more even wear of the linings 17 in conjunction with the brake force augmentation.

In the construction according to FIGS. 6 and 7, the braking-force bell crank levers 11 are retained on the backing plates 12 by respective bracket-like undulating wire springs 15. Each wire spring 15 has two bracket legs 15e, 15f which respectively extend radially outwardly and radially inwardly of the braking-force bell crank lever 11. A web 15g interconnecting the two legs 15e, 15f embraces the backing plate 12 and acts on the front face thereof, as shown in FIG. 6. The legs 15e, 15f engage from behind respective stops 28 provided on the upper and on the lower side of the braking-force bell crank lever 11, respectively.

Figure 8:
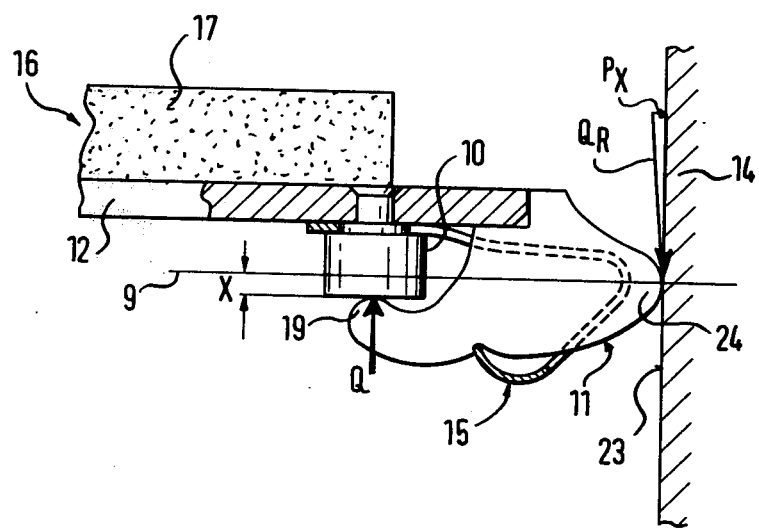
FIG. 8 is a sectional view similar to FIG. 1 of still another construction.

In the construction according to FIG. 8, the end bead 19 is spaced by an amount X further away from the brake disc 17 than the apex of the bead 24, as a result of the provision of a spacer 10. This measure serves to obtain an increase of the friction force between the bead 24 and the abutment surface 23. This results from the force Q and its counterforce $Q_R$ which is directed at the engagement surface 23 normal to the connecting line between the points of contact of the beads 19, 24. The plane of effect of the pressing force between the bead 24 and the engagement surface 23 is indicated by the reference numeral 9. There results a force $P_X$ which contributes to the magnitude of the pressing force.

While I have described above the principles of our invention in connection with specific apparatus it is to be clearly understood that this description is made only by way of example and not as a limitation to the scope of our invention as set forth in the objects thereof and in the accompanying claims.

I claim:

1. A spot-type disc brake unit for use with a brake disc rotatable about an axis relative to a support at least in a forward circumferential direction, comprising
   a brake shoe carrier member non-rotatably mounted on the support in use;
   at least one brake shoe mounted on said carrier member for movement axially of the brake disc and with freedom of limited displacement at least in the forward circumferential direction of the brake disc in use,
   said brake shoe having a friction surface facing toward and a backing surface facing away from the brake disc, and disc entry and exit end faces respectively facing substantially opposite to and in the forward circumferential direction of the brake disc in use;

means for moving said brake shoe during a braking operation into a position in which said friction surface engages the brake disc to brake the same and the brake disc entrains said brake shoe for limited displacement therewith in the forward circumferential direction;

means for applying an additional force to a selected region of said brake shoe during the braking operation, including
at least one bell-crank lever element disposed at said disc exit end face and having
a first arm extending into the path of displacement of said disc exit end face in said forward circumferential direction to receive an actuating force therefrom,
a fulcrum portion axially movable relative to said carrier member and so engaging at least during the braking operation as to prevent relative axial movement therebetween, and
a second arm extending into juxtaposition with said backing surface at said selected region of said brake shoe and operative for applying the additional force thereto upon angular displacement of said lever element by said actuating force about said fulcrum portion; and means for resiliently attracting said lever element to said brake shoe such that, between the braking operations, said lever element and the area of engagement of the fulcrum portion thereof with said carrier member follow said brake shoe in its axial movement toward the brake disc as wear at said friction surface gradually reduces the axial thickness of said brake shoe.

2. The disc brake unit as defined in claim 1, wherein said brake shoe includes a backing plate having said backing surface, and friction lining rigid with said backing plate and having said friction surface; and wherein
said resilient attracting means includes spring means acting on said brake shoe and on said lever element.

3. The disc brake unit as defined in claim 2, wherein said lever element is so arranged relative to said carrier member that said fulcrum portion supports the same on said carrier member for angular displacement during the braking operation about a pivoting axis substantially parallel to the radial direction of the brake disc.

4. The disc brake unit as defined in claim 3, wherein said lever element has an abutment surface at the end of said second arm which is close to said first arm and facing said backing plate; and wherein
said resilient attracting means is operative for urging said abutment surface toward contact with said backing plate.

5. The disc brake unit as defined in claim 4, wherein said first arm has a stop surface facing toward said backing plate at said disc exit face and extending substantially at a right angle with respect to said abutment surface.

6. The disc brake unit as defined in claim 3, wherein said fulcrum portion is constituted by an arched projection of said lever element; and wherein
said carrier member has a substantially axially extending engagement surface cooperating with said arched projection to define said pivoting axis.

7. The disc brake unit as defined in claim 6, wherein said arched projection is a bead extending substantially parallel to the radial direction.

8. The disc brake unit as defined in claim 6, and further comprising means at the area of engagement of said arched projection with said engagement surface for increasing the friction therebetween during the braking operation.

9. The disc brake unit as defined in claim 8, wherein said friction-increasing means includes at least one notch situated at the area of engagement of said arched projection with said engagement surface and extending substantially parallel to the radial direction.

10. The disc brake unit as defined in claim 2, wherein said spring means includes at least one spring connected to said backing plate and to said lever element.

11. The disc brake unit as defined in claim 10, wherein said spring is a tension spring.

12. The disc brake unit as defined in claim 10, wherein said spring is an undulating spring.

13. The disc brake unit as defined in claim 12, wherein said undulating spring is a leaf spring having a substantially S-shaped longitudinal configuration and including two portions one of which abuts said backing plate from the front and the other of which abuts said lever element from behind as considered in the axial direction toward the brake disc.

14. The disc brake unit as defined in claim 13, wherein said backing plate has a front face and a pin-shaped projection extending forwardly therefrom; and wherein
said one portion of said leaf spring has an aperture receiving said pin-shaped projection.

15. The disc brake unit as defined in claim 13, wherein said leaf spring has a central portion having a slot-shaped opening therein; and wherein
said lever element is partially received in said slot-shaped opening.

16. The disc brake unit as defined in claim 12, wherein said undulating spring is a bracket-shaped wire spring and abutting said backing plate from the front and said lever element from behind as considered in the axial direction toward the brake disc.

17. The disc brake unit as defined in claim 16, wherein said lever element has a plurality of stops; and wherein
said wire engages said stops.

18. The disc brake unit as defined in claim 2, wherein said moving means includes an actuating piston mounted on said carrier member; wherein
said carrier member includes a carrier element; wherein
said brake shoe is at least partially supported on said caliper element at the same side of the brake disc in use as said actuating piston; further comprising
an additional brake shoe supported on said carrier member on the opposite side of said brake disc in use; and wherein
only said brake shoe is equipped with said additional force applying means.

19. The disc brake unit as defined in claim 2, wherein said second arm of said lever element has a bead portion transmitting the additional force to said brake shoe, said bead portion being more distant from the brake disc in use than said fulcrum portion of said lever element.

* * * * *